(12) United States Patent
Jacobsen et al.

(10) Patent No.: US 8,706,170 B2
(45) Date of Patent: Apr. 22, 2014

(54) MINIATURE COMMUNICATIONS GATEWAY FOR HEAD MOUNTED DISPLAY

(75) Inventors: Jeffrey J. Jacobsen, Hollister, CA (US); Christopher Parkinson, Richland, WA (US); Stephen A. Pombo, Campbell, CA (US)

(73) Assignee: Kopin Corporation, Westborough, MA (US)

( * ) Notice: Subject to any disclaimer, the term of this patent is extended or adjusted under 35 U.S.C. 154(b) by 60 days.

(21) Appl. No.: 13/235,944

(22) Filed: Sep. 19, 2011

(65) Prior Publication Data

US 2012/0068914 A1 Mar. 22, 2012

Related U.S. Application Data

(60) Provisional application No. 61/384,508, filed on Sep. 20, 2010.

(51) Int. Cl.
*H04M 1/00* (2006.01)

(52) U.S. Cl.
USPC .............. 455/566; 84/611; 455/456.1; 345/8

(58) Field of Classification Search
USPC ........................................................ 455/566
See application file for complete search history.

(56) References Cited

U.S. PATENT DOCUMENTS

| | | | |
|---|---|---|---|
| 5,990,793 A | 11/1999 | Bieback | |
| 6,010,216 A | 1/2000 | Jesiek | |
| 6,084,556 A * | 7/2000 | Zwern | ................................ 345/8 |
| 6,108,197 A | 8/2000 | Janik | |
| 6,204,974 B1 | 3/2001 | Spitzer | |
| 6,325,507 B1 | 12/2001 | Jannard et al. | |
| 6,738,485 B1 * | 5/2004 | Boesen | ........................ 381/312 |
| 6,798,391 B2 | 9/2004 | Peterson, III | |
| 6,853,293 B2 | 2/2005 | Swartz et al. | |
| 6,900,777 B1 | 5/2005 | Hebert et al. | |
| 6,922,184 B2 | 7/2005 | Lawrence et al. | |

(Continued)

FOREIGN PATENT DOCUMENTS

| | | |
|---|---|---|
| WO | WO 95/21408 A1 | 8/1995 |
| WO | WO 95/23994 A1 | 9/1995 |

(Continued)

OTHER PUBLICATIONS

International Search Report and Written Opinion of PCT/US11/52104 dated Jan. 31, 2012.

(Continued)

*Primary Examiner* — Zhiyu Lu
*Assistant Examiner* — David Bilodeau
(74) *Attorney, Agent, or Firm* — Hamilton, Brook, Smith & Reynolds, P.C.

(57) ABSTRACT

A head mounted display (HMD) system includes a number of separately and uniquely packaged components. A first component is a headset that incorporates at least a microphone input and speaker output devices into headset housing apparatus designed to be supported about the user's head or face. A microdisplay element is located in an optical pod at the end of an adjustable boom as part of the headset. Additional components, including electronic circuits, such as a microcomputer, one or more wired and wireless interfaces, associated memory or storage devices, auxiliary device mounts and the like are packaged in the headset or as a pager sized gateway device having a belt clip.

19 Claims, 9 Drawing Sheets

(56) References Cited

U.S. PATENT DOCUMENTS

| | | |
|---|---|---|
| 6,956,614 B1 | 10/2005 | Quintana et al. |
| 6,966,647 B2 | 11/2005 | Jannard et al. |
| 7,004,582 B2 | 2/2006 | Jannard et al. |
| 7,013,009 B2 | 3/2006 | Warren |
| 7,082,393 B2 | 7/2006 | Lahr |
| 7,147,324 B2 | 12/2006 | Jannard et al. |
| 7,150,526 B2 | 12/2006 | Jannard et al. |
| 7,213,917 B2 | 5/2007 | Jannard et al. |
| 7,216,973 B2 | 5/2007 | Jannard et al. |
| 7,219,994 B2 | 5/2007 | Jannard et al. |
| 7,231,038 B2 | 6/2007 | Warren |
| 7,249,846 B2 | 7/2007 | Grand et al. |
| 7,278,734 B2 | 10/2007 | Jannard et al. |
| 7,331,666 B2 | 2/2008 | Swab et al. |
| 7,445,332 B2 | 11/2008 | Jannard et al. |
| 7,452,073 B2 | 11/2008 | Jannard et al. |
| 7,458,682 B1 | 12/2008 | Lee |
| 7,461,936 B2 | 12/2008 | Jannard |
| 7,494,216 B2 | 2/2009 | Jannard et al. |
| 7,512,414 B2 | 3/2009 | Jannard et al. |
| 7,620,432 B2 | 11/2009 | Willins et al. |
| 7,682,018 B2 | 3/2010 | Jannard |
| 7,740,353 B2 | 6/2010 | Jannard |
| 7,744,213 B2 | 6/2010 | Jannard et al. |
| 7,753,520 B2 | 7/2010 | Fuziak, Jr. |
| 7,760,898 B2 | 7/2010 | Howell et al. |
| 7,798,638 B2 | 9/2010 | Fuziak, Jr. |
| 7,806,525 B2 | 10/2010 | Howell et al. |
| 7,918,556 B2 | 4/2011 | Lewis |
| 7,959,084 B2 | 6/2011 | Wulff |
| 7,966,189 B2 | 6/2011 | Le et al. |
| 7,967,433 B2 | 6/2011 | Jannard et al. |
| 7,969,383 B2 | 6/2011 | Eberl et al. |
| 7,969,657 B2 | 6/2011 | Cakmakci et al. |
| 7,976,480 B2 | 7/2011 | Grajales et al. |
| 7,988,283 B2 | 8/2011 | Jannard |
| 7,997,723 B2 | 8/2011 | Pienimaa et al. |
| 8,010,156 B2 | 8/2011 | Warren |
| 8,020,989 B2 | 9/2011 | Jannard et al. |
| 8,025,398 B2 | 9/2011 | Jannard |
| 8,072,393 B2 | 12/2011 | Riechel |
| 8,092,011 B2 | 1/2012 | Sugihara et al. |
| 8,098,439 B2 | 1/2012 | Amitai et al. |
| 8,123,352 B2 | 2/2012 | Matsumoto et al. |
| 8,140,197 B2 | 3/2012 | Lapidot et al. |
| 8,184,983 B1* | 5/2012 | Ho et al. ............ 398/130 |
| 8,212,859 B2 | 7/2012 | Tang et al. |
| 2002/0015008 A1 | 2/2002 | Kishida et al. |
| 2002/0030649 A1* | 3/2002 | Zavracky et al. ......... 345/87 |
| 2002/0094845 A1 | 7/2002 | Inasaka |
| 2003/0064732 A1* | 4/2003 | McDowell et al. ........ 455/456 |
| 2003/0068057 A1 | 4/2003 | Miller et al. |
| 2005/0264527 A1 | 12/2005 | Lin |
| 2006/0028400 A1* | 2/2006 | Lapstun et al. ............ 345/8 |
| 2006/0132382 A1 | 6/2006 | Jannard |
| 2006/0221266 A1* | 10/2006 | Kato et al. ............ 348/838 |
| 2007/0009125 A1 | 1/2007 | Frerking et al. |
| 2007/0103388 A1 | 5/2007 | Spitzer et al. |
| 2007/0180979 A1 | 8/2007 | Rosenberg et al. |
| 2008/0055194 A1* | 3/2008 | Baudino et al. ............ 345/8 |
| 2008/0144854 A1 | 6/2008 | Abreu et al. |
| 2008/0198324 A1 | 8/2008 | Fuziak |
| 2009/0099836 A1* | 4/2009 | Jacobsen et al. ............ 704/3 |
| 2009/0117890 A1* | 5/2009 | Jacobsen et al. .......... 455/419 |
| 2009/0128448 A1 | 5/2009 | Riechel |
| 2009/0154719 A1 | 6/2009 | Wulff et al. |
| 2009/0180195 A1 | 7/2009 | Cakmakci et al. |
| 2009/0251409 A1* | 10/2009 | Parkinson et al. .......... 345/156 |
| 2010/0020229 A1 | 1/2010 | Hershey et al. |
| 2010/0033830 A1 | 2/2010 | Yung |
| 2010/0053069 A1 | 3/2010 | Tricoukes et al. |
| 2010/0121480 A1 | 5/2010 | Stelzer et al. |
| 2010/0128626 A1* | 5/2010 | Anderson et al. .......... 370/252 |
| 2010/0141554 A1* | 6/2010 | Devereaux et al. ............ 345/7 |
| 2010/0171680 A1 | 7/2010 | Lapidot et al. |
| 2010/0203862 A1* | 8/2010 | Friedlander et al. ....... 455/404.1 |
| 2010/0238184 A1 | 9/2010 | Janicki |
| 2010/0271587 A1 | 10/2010 | Pavlopoulos |
| 2010/0277563 A1 | 11/2010 | Gupta et al. |
| 2010/0289817 A1 | 11/2010 | Meier et al. |
| 2011/0001699 A1* | 1/2011 | Jacobsen et al. ........... 345/157 |
| 2011/0089207 A1 | 4/2011 | Tricoukes et al. |
| 2011/0090135 A1 | 4/2011 | Tricoukes et al. |
| 2011/0187640 A1* | 8/2011 | Jacobsen et al. ........... 345/156 |
| 2011/0214082 A1 | 9/2011 | Osterhout et al. |
| 2011/0221669 A1 | 9/2011 | Shams et al. |
| 2011/0221671 A1 | 9/2011 | King, III et al. |
| 2011/0227812 A1 | 9/2011 | Haddick et al. |
| 2011/0227813 A1 | 9/2011 | Haddick et al. |
| 2011/0254698 A1 | 10/2011 | Eberl et al. |
| 2011/0255050 A1 | 10/2011 | Jannard et al. |
| 2011/0273662 A1 | 11/2011 | Hwang et al. |
| 2012/0013843 A1 | 1/2012 | Jannard |
| 2012/0026071 A1 | 2/2012 | Hamdani et al. |
| 2012/0056846 A1 | 3/2012 | Zaliva |
| 2012/0062445 A1 | 3/2012 | Haddick et al. |
| 2012/0105740 A1 | 5/2012 | Jannard et al. |
| 2012/0114131 A1 | 5/2012 | Tricoukes et al. |
| 2012/0188245 A1 | 7/2012 | Hyatt |
| 2012/0257657 A1* | 10/2012 | Subrahmanya et al. ...... 375/222 |
| 2013/0035090 A1* | 2/2013 | Moshfeghi ............ 455/422.1 |

FOREIGN PATENT DOCUMENTS

| | | |
|---|---|---|
| WO | WO 00/79327 A1 | 12/2000 |
| WO | WO 2009/076016 A1 | 6/2009 |
| WO | WO 2011/051660 A1 | 5/2011 |
| WO | WO 2012/040386 A1 | 3/2012 |

OTHER PUBLICATIONS

Notification Concerning Transmittal of International Preliminary Report on Patentability, PCT/US2011/052104, date of mailing Apr. 4, 2013.

* cited by examiner

MINIATURE COMMUNICATIONS GATEWAY FOR HEAD MOUNTED DISPLAY

RELATED APPLICATION

This application claims the benefit of U.S. Provisional Application No. 61/384,508, filed on Sep. 20, 2010. The entire teachings of the above application(s) are incorporated herein by reference.

TECHNICAL FIELD

The present disclosure relates to configurations for a head mounted display or other video eyewear having numerous capabilities wherein a selected portion of the circuitry is packaged into a pager sized enclosure or other form that is conveniently clipped onto a user's belt or elsewhere on their person.

BACKGROUND

Recently developed microdisplays can provide a large format, high resolution color pictures and streaming video in a very small form factor. One use for such displays is in a head mounted display (HMD) worn on the user's face or head similar to a pair of eyeglasses or headphones. The electronics enclosed in such devices have become extremely sophisticated including integrated fully functional personal computer processors, packaged with wireless interfaces to provide full smart phone functions, and other input devices such as head tracking accelerometers, gyros, cameras, voice recognition software and other components. Indeed, HMD products such as the Golden-i™ available from Kopin Corporation of Taunton, Mass. now provide a complete "head-worn laptop" experience.

SUMMARY

While these sophisticated HMD devices provided a rich personal computing environment, they are not without their limitations. In particular, the approach of incorporating all of the system components in a housing that is worn on a user's head has some drawbacks.

Some users are concerned about long-term exposure to high power radio frequency radiation close to their head such as emitted by Bluetooth cellular, 3G and 4G, and WiFi radios.

Still other users, having grown accustomed to small Bluetooth headsets, find the additional weight presented by peripherals such as central processing units, input and output devices, data storage devices, radios, and other peripherals distracting and/or tiring, straining on their head and/or neck muscles and/or otherwise problematic.

As a solution to these difficulties, in preferred embodiments the components of a head mounted display (HMD) system are packaged in a particular and unique way. A first component is a headset that incorporates at least a microphone input, speaker output, and optimally, only a few other devices, into a small housing designed to be supported by a user's head or face. A microdisplay element is located on a boom that is preferably removably insertable into this housing.

The optimal circuits included in this headset housing may typically be motion, position and gesture sensing devices and wireless interfaces (i.e., Bluetooth and/or WiFi).

Additional system components, including electronic circuits, such as a microcomputer, one or more wired and/or higher powered wireless interfaces, associated memory or storage devices, auxiliary device mounts and the like are packaged in a separate second component, which may be a pager sized gateway device having a belt clip. The belt mounted gateway device may also include cellular radios, WiFi, Bluetooth, microprocessor, memory, batteries and other peripheral devices and/or connections.

BRIEF DESCRIPTION OF THE DRAWINGS

The foregoing will be apparent from the following more particular description of example embodiments, as illustrated in the accompanying drawings, in which like reference characters refer to the same parts throughout the different views. The drawings are not necessarily to scale, emphasis instead being placed upon illustrating embodiments.

DETAILED DESCRIPTION OF THE INVENTION

A description of example embodiments follows.

Figure 1A:
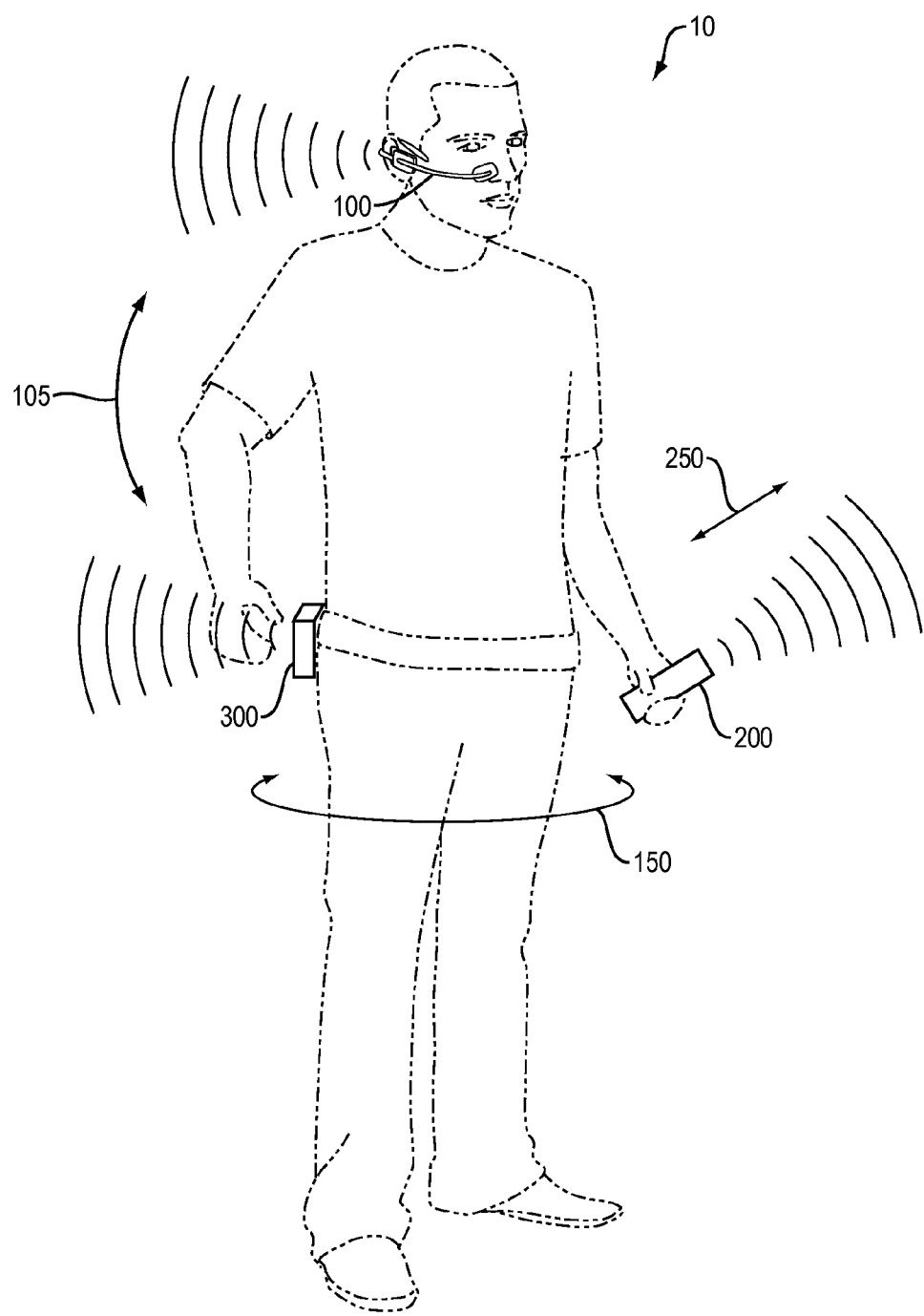
FIG. 1A is a view showing a user wearing the HMD headset and having the HMD gateway clipped to his belt.

FIG. 1A shows a remote control wireless head mounted display (HMD) system 10 (also referred to as a video eyewear system) that incorporates a high resolution (VGA or better) microdisplay element, wireless communication, smart phone, personal computer, and other features as described more fully below.

Audio input and output devices, including at least one or more microphone input devices and one or more speaker output devices are included in the headset type housing 100 that fits on the head of the user. Typically located in the headset housing 100 are only certain additional electronic circuits only as necessary, such as audio circuits, head motion, hand position and gesture sensors, and short range wireless communication circuits such as lower power Bluetooth and/or WiFi radio(s).

Forming part of the overall system is an associated HMD gateway 300. The HMD gateway 300 is a small form factor housing of a size similar to a belt-wearable pager. The HMD gateway 300 includes certain electronic circuits that operate with the HMD headset housing 100 to provide a complete smart phone and/or personal computer system. These auxiliary circuits may include a microcomputer, one or more wired and/or wireless long range interfaces, associated memory or storage devices, pico-projector, touch pad, display screen, joy stick or other button controls, and/or peripheral mounting slots or connections.

The HMD headset housing 100 and HMD gateway 300 are connected to each other, at a relatively low transmission power, a Bluetooth and/or WiFi link 105. The transmit power need only be sufficient for such Bluetooth or WiFi signals to travel just a few feet from a user's head to the HMD gateway 300 attached to their belt.

Via this connection 105, headset 100 and gateway 300 operate together to provide various functions. In one embodiment, they may operate as a stand along personal computer. In other embodiments, they may be used as a remote display for streaming video signals provided over another Bluetooth and/or WiFi link 150 or other wireless interface 150 to yet another computing device such as a host device 200. The host 200 may be a laptop, cell phone, Blackberry, iPhone, Android or other smart phone device, PC, or tablet having similar or greater computational complexity and/or network connectivity than the HMD system 100, 300 itself.

The host 200 may be further connected to other networks, such as through a Wide Area Network (WAN) connection 250 to the Internet. The gateway 300 and host 200 are connected to one another through a suitable wireless connection, such as are provided by a Bluetooth link or Wireless Local Area Network (WLAN) and/or wireless Wide Area Network (WAN) cellular 150. The HMD headset 100 maybe further connected to the belt worn gateway 300 by lower power wireless connection to minimize SAR radiation exposure to user's head.

Figure 1B:
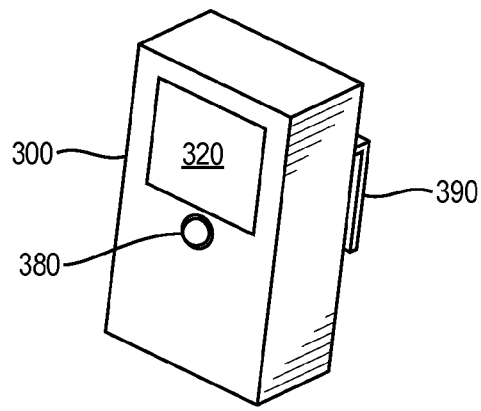
FIGS. 1B, 1C and 1D are more detailed views of various configurations of the belt-worn gateway.
Figure 1C:
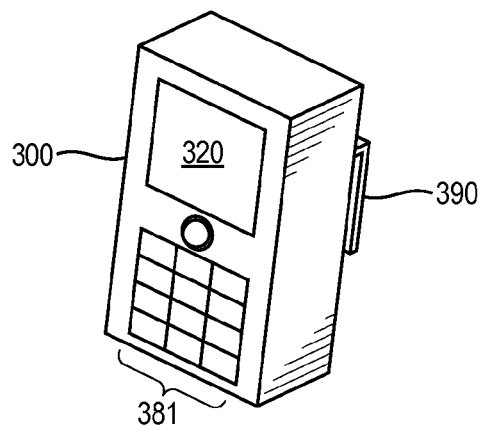
Figure 1D:
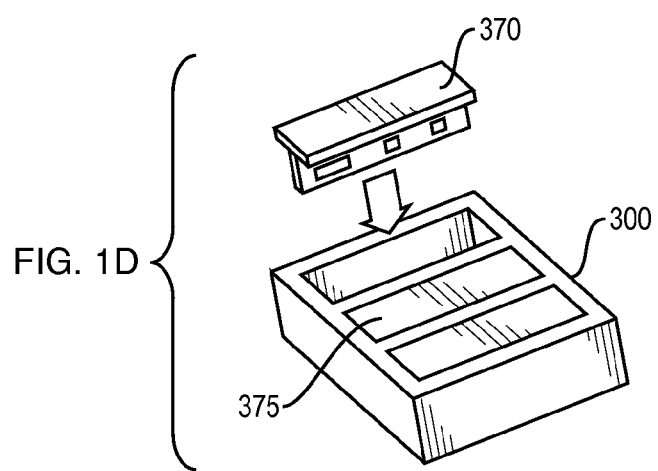

In other configurations, the HMD gateway 300 may itself have WLAN and/or Wide Area Network (WAN) connectivity 250 such as 3G cellular or 4G LTE network interface built-in. In this configuration, the HMD headset 100 and gateway 300 can function together to provide a complete, fully functional smart phone FIG. 1B is an exterior view of one embodiment of an HMD gateway 300 showing that the housing 300 may have a belt clip 390, and may incorporate one or more input devices, such as a trackball device 380 and/or output devices such as display 320. In other configurations, as shown in FIG. 1C, the HMD gateway 300 may include additional input devices, such as a full keypad, touch display or touch pad 381. The rear view of the HMD gateway 300 in FIG. 1D shows that there may be one or more slots 375 for accepting additional functionality or personality cards 370. These cards may take the form of an SD card, MD card, SIM card or added internal printed circuit board module and may provide functionalities such as cellular connectivity, additional memory and so forth.

In embodiments such as shown in FIG. 1C, a small display 320 in the gateway 300 may provide simple functions such as displaying the time of day, or may have a touch screen capability for tactile control inputs to the HMD system or other host system 200. The display 320 on the gateway 300 may also have slightly larger form factor, such as for displaying email messages, photo images, drawings and/or video content.

Figure 1E:
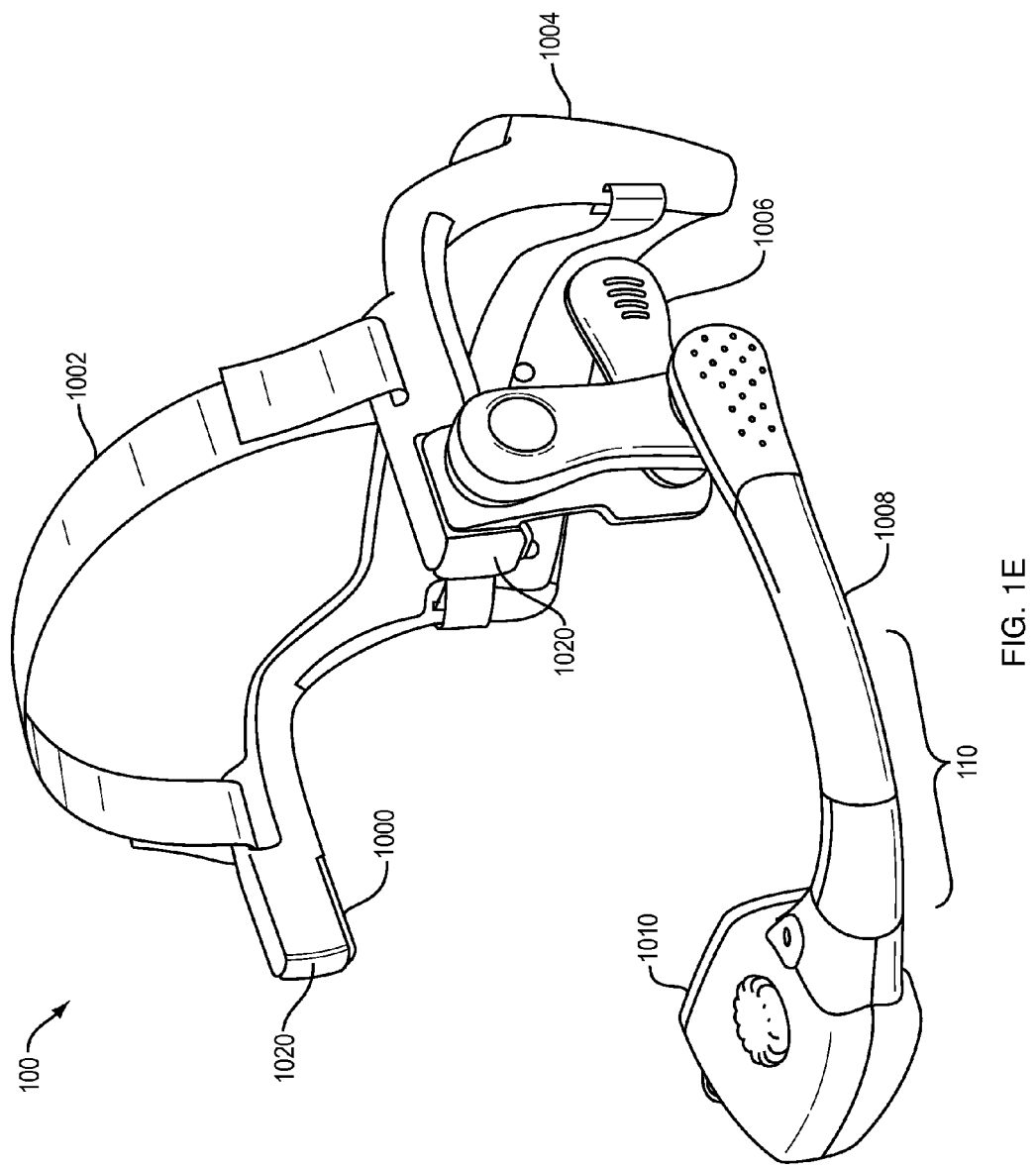
FIG. 1E is a more detailed view of the headset.

FIG. 1E shows the head mounted display (HMD) headset 100 component in more detail. It generally includes a frame 1000, a strap 1002, a back section 1004, a speaker 1006, cantilever or arm 1008 and microdisplay subassembly 1010. The sides of the device include a peripheral port "hot shoe" 1020 that can provide corresponding connections to the microdisplay 1010 or other accessories, as explained further below, so that a user can remove or attach various components to the HMD 100.

The arm 1008 and microdisplay 1010 are preferably assembled together as a unit, but forming a detachable video element 150 that connects to the HMD system 10 via one of the hot shoes 1020. In this way the microdisplay arm 110 can be placed in the left or right hot shoe to be near the user's left or right eye.

An entire HMD system 10 may thus consist of the HMD headset 100, the video arm 110, and communication gateway device 300. In other embodiments, the video arm 110 may be an integral part of the headset 100.

Figure 2:
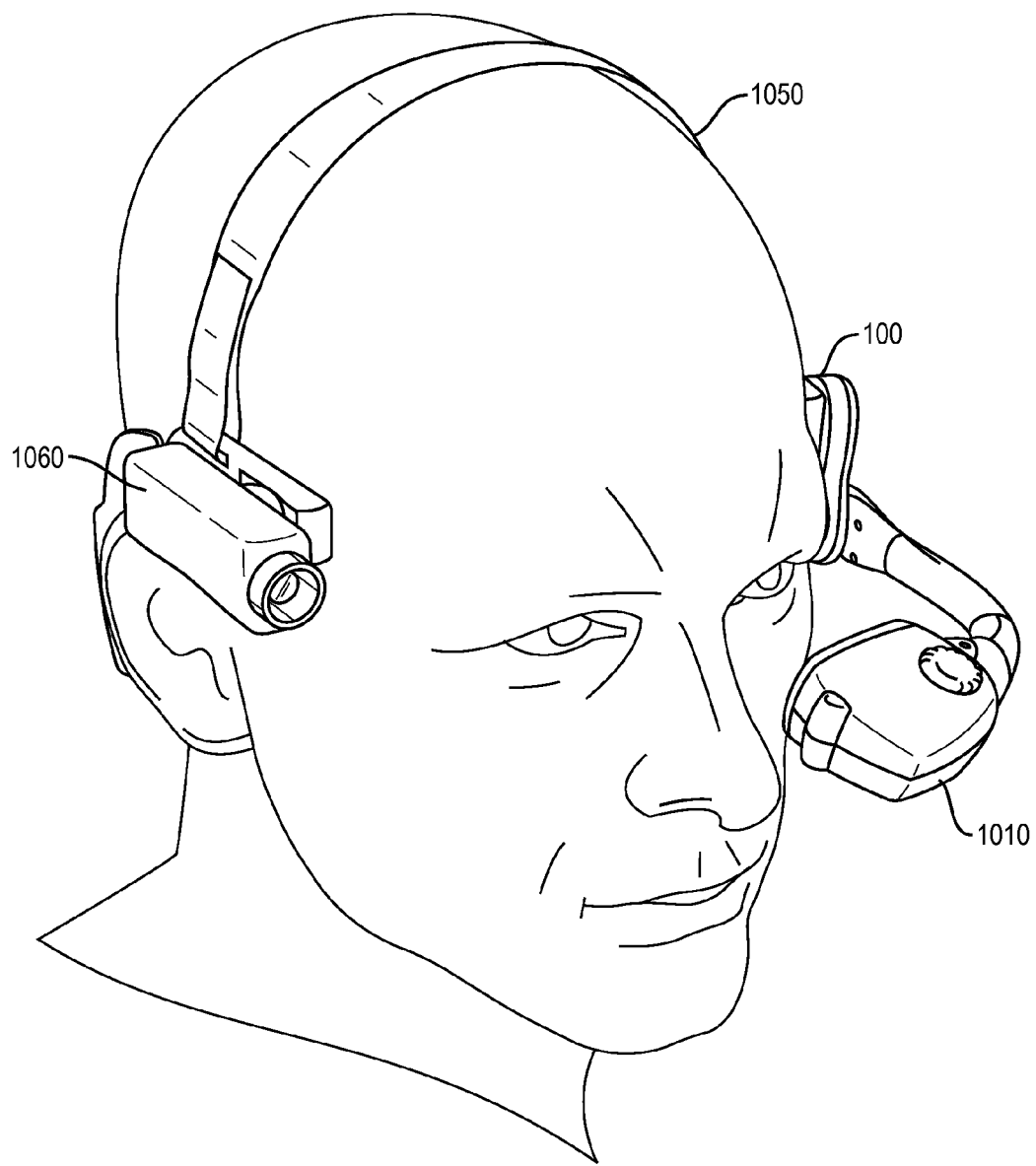
FIG. 2 is another perspective view showing the headset with a camera peripheral.

FIG. 2 is a view of the HMD head set 100 portion as worn on the head of a user where a camera accessory 1060 has been placed in one of the ports 1020. The camera 1060 can include both audio and video sensing and recording capability and may for example, be in a small form factor similar to a "bullet cam". As will be explained further below, user commands, which may be a head motion, hand or head gesture or voice commands, are provided by the user to control the settings of or information shown on the display 1010, settings of the camera 1060, and/or to perform other functions. The HMD system 10 may provide other functions to other accessories beyond the camera such as additional speakers, additional cameras, light sources and any other electronic components that may be put into the hot shoe 1020.

The HMD system 10 may operate as a stand alone mobile PC and communications system and/or operate as a remote control for a host device 200, as was mentioned above in connection with FIG. 1. To that end, audio input and/or output devices including microphone input and speaker outputs, are also included in the HMD headset housing 100. Also included in the headset housing 100 are only selected electronic circuits, including as will be understood shortly, one or more wireless interfaces, and/or motion, position and/or gesture sensors. The camera and/or motion, position and/or gesture sensors are used to track the motion of the user's head or hands, and the microphone receives audio input signals. These motion and audio inputs are then translated into commands to the system.

Figure 3:
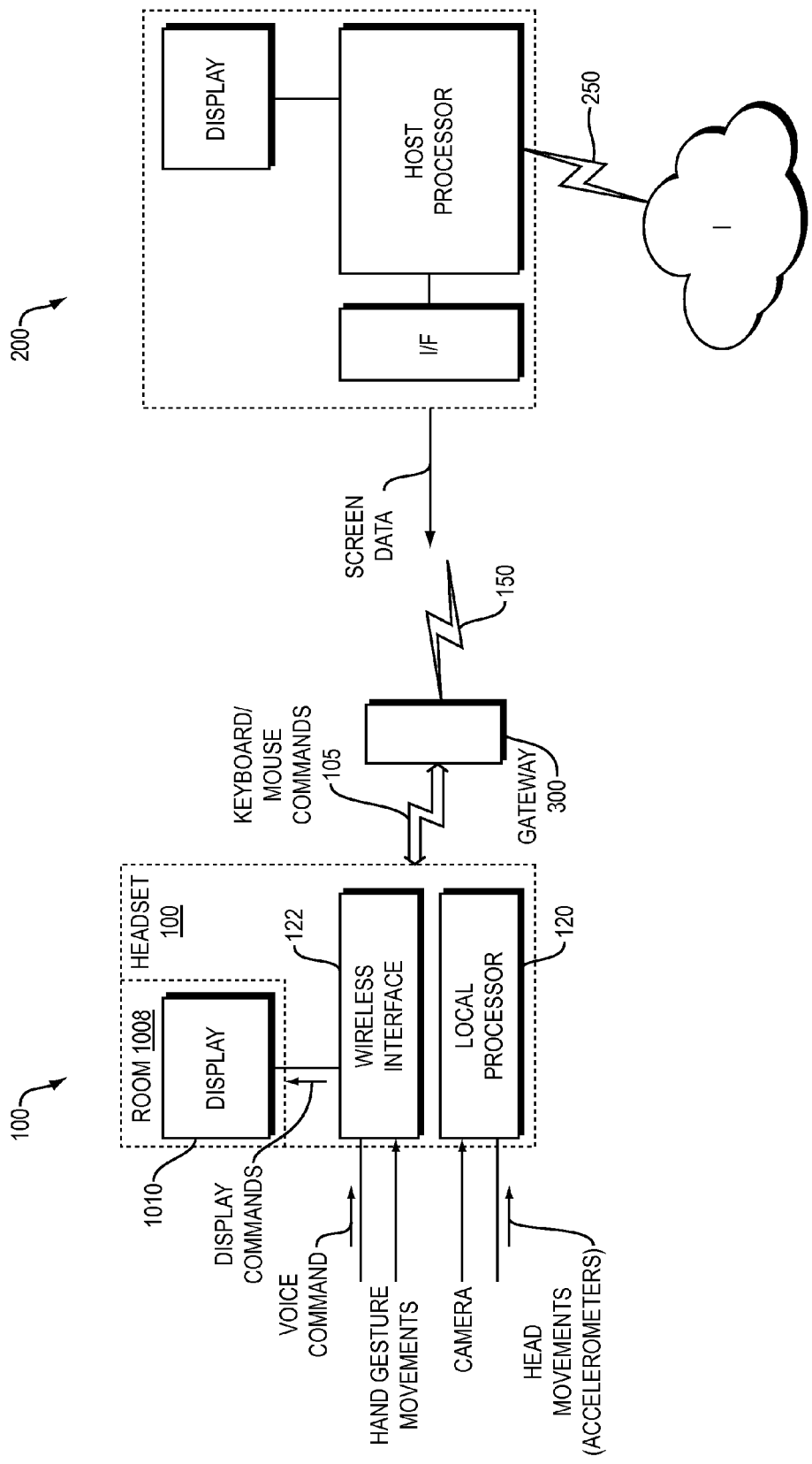
FIG. 3 is a high level functional diagram showing the HMD system and its use as a controller for a host processor such as a personal computer.

The wireless interface 150 also enables HMD system 100 to be used as a remote control for a host computing device 200 (see FIG. 3).

As shown in FIG. 3, the HMD headset 100 includes the aforementioned display 1010, local processor 120, and wireless interface 122. Headset 100 receives inputs from the user such as voice input via the microphone, hand movements or gestures via the camera or other optical sensors, and/or head movement or gesture inputs via the head tracking circuitry. These are processed by software running on local processor 120 or gateway 300 or host 200 into input commands. The input commands may be specific to operation of the HMD 10 system, or may correspond to keyboard and/or mouse commands that are used by a local processor 120 in the HMD headset 100 itself or sent over the Bluetooth and/or WiFi interface 150 to the gateway 300 or host 200. These translated voice, gesture, movement, position and/or motion commands are then interpreted by destination operating system/application software to perform various functions.

Among these commands may be to fetch and display a document. Among other commands may be to retrieve information from the Internet and display it, such as a web page. Still among other commands may be to select a field of view within the virtual display and then return that selected screen to the remote device. Thus, it should be understood that a very large format to virtual display area may be associated with application software running on or in an operating system running on the local processor 120 or host 200 for only a portion of that large virtual display area within the field of view is selected by various voice commands and/or head movements supplied to the display 1010.

Further information concerning the functions that can be performed by the HMD 100 are explained in a co-pending U.S. patent application entitled "Remote Control of Host Application Using Motion and Voice Commands" dated May 5, 2010, Ser. No. 12/774,179, by the same inventors and incorporated by reference herein in its entirety.

Figure 4:
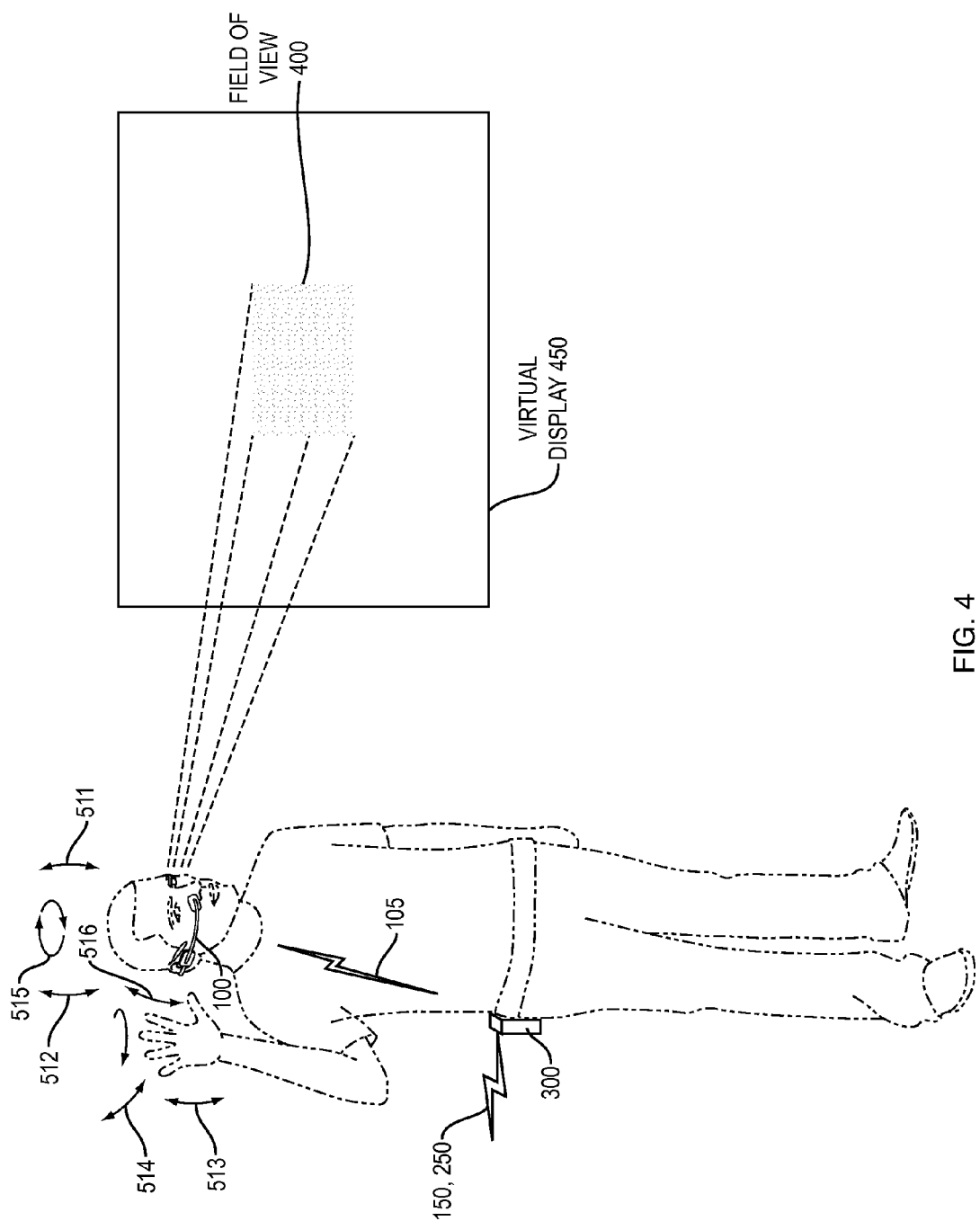
FIG. 4 illustrates a person using hand gestures and/or head movements to control aspects of a presentation on the microdisplay.

Referring to FIG. 4, and as explained above and below in further detail, the HMD system, including headset 100 and gateway 300 can provide hands-free, remote control over the operations of the included personal computer, local processor(s) and/or attached or remote peripheral devices, systems and/or networks. The headset 100 is enabled to receive inputs as voice commands, hand or head movements, and/or gestures. Head movements can be detected with a 3 axis to 9 axis degrees of freedom orientation sensor, GPS, digital compass (multi-axis magnetometer). Cameras and/or motion detectors provide hand motion, and/or user gesture inputs.

Thus, located within HMD headset 100 are circuits including one or more cameras (optical sensors) and/or various motion sensor(s) and/or positional sensor(s) that are used to track the motion and/or position of the user's head, hands and/or body in at least a first axis 511 (horizontal), but preferably also a second (vertical) 512, a third (depth) 513, a fourth (pitch) 514, a fifth (roll) 515 and a sixth (yaw) 516. A 3 axis magnetometer (digital compass) can optionally be added to provide the HMD headset 100 with a full 9 axis degrees of freedom positional accuracy.

In particular embodiments, the headset 100 also includes one or more microphones for receiving audio signals to provide voice commands from the user.

These inputs are then forwarded to the local processor 120 and/or over the wireless interface 105 to gateway 300 and/or further over wireless interface 250 to host 200 for interpretation as commands and further handling.

In one example, these commands determine how to control presentation of visual information displayed on the microdisplay 1010. For example, the user can select a field of view 400 within a much larger area defined by a virtual display 450. The user can typically control the position, extent (e.g., X-Y or 3D range), and/or magnification of the field of view 400 using head movements, hand gestures or body gestures or in other ways, such as with voice commands.

Thus, it should be understood that a very large format virtual display area might be associated with application software or an operating system running on the gateway 300 or host 200. However, only a portion of that large virtual display area within the field of view 400 is returned to and actually displayed by the HMD headset device 100.

For example, a user may initially see a center portion of the screen and may select one of two modes with a voice command: either (a) "move cursor" mode or (b) "pan/zoom" mode. Selecting the first of these modes with a voice command, the user can then use hand gestures or head movements to cause the cursor to move around within the virtual display area. However, the user may then issue another vocal command such as "SELECT PAN", causing the screen to pan out, allow the user to better see a different part of the virtual display area. Next, in this example, using the hand or head movements and speaking some other "SELECT" vocal command, the user may then further change the field of view.

Figure 5:
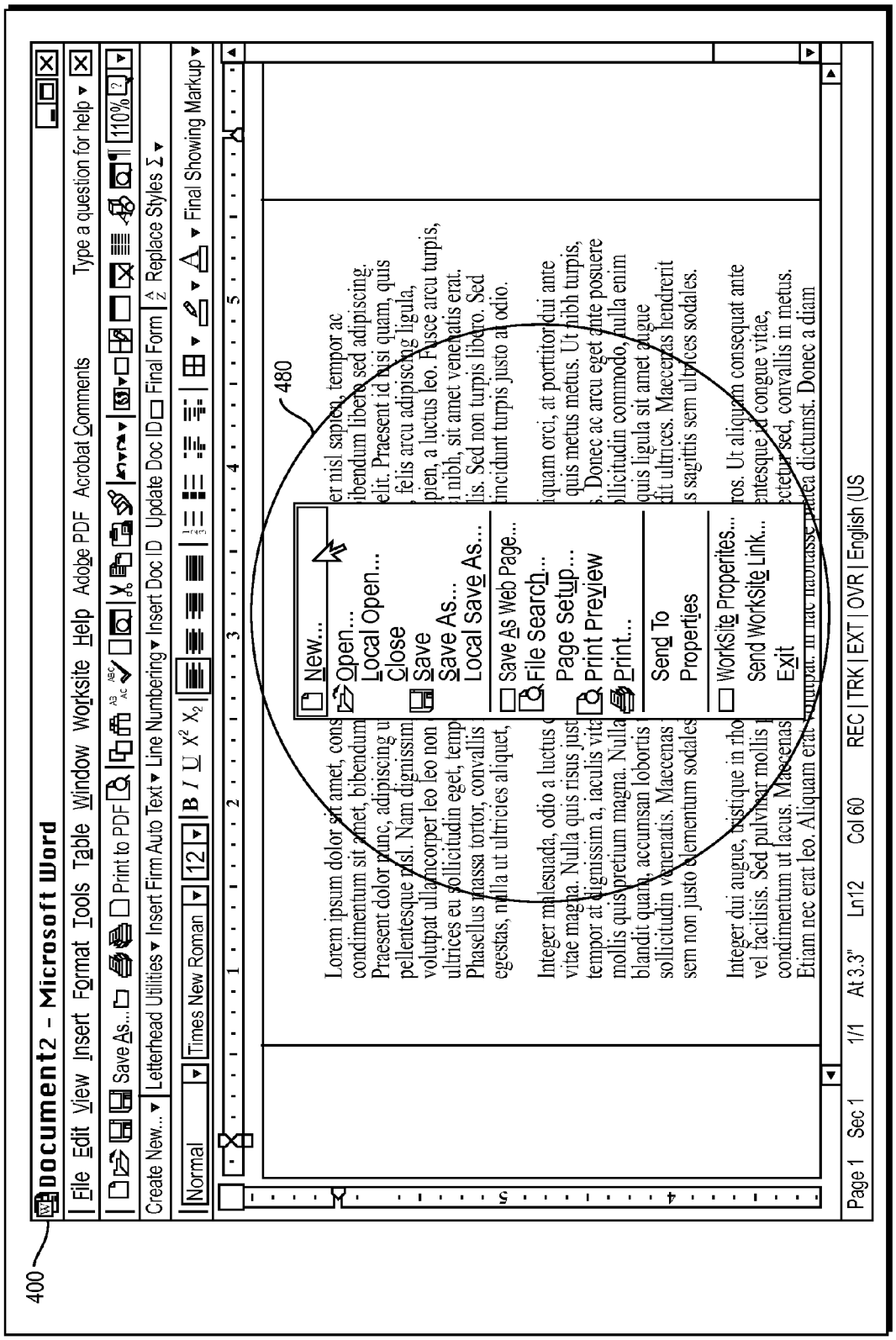
FIG. 5 is an example of how voice commands may be used to display and select menu options.

FIG. 5 illustrates a specific example using the HMD system 10 to control aspects of a visual presentation. As shown, a main menu of an application software program such as Microsoft Word typically runs across the top or bottom of a screen. Using a "CALL FILE MENU" voice command, the "File" sub menu can be caused to appear as an overlay in a center 480 of the field of view 400. The user can then select commands within the menu such as via further verbal or hand/head movement commands. Upon selection of a command, the menu then disappears allowing a viewing of the underlying information once again.

Figure 6:
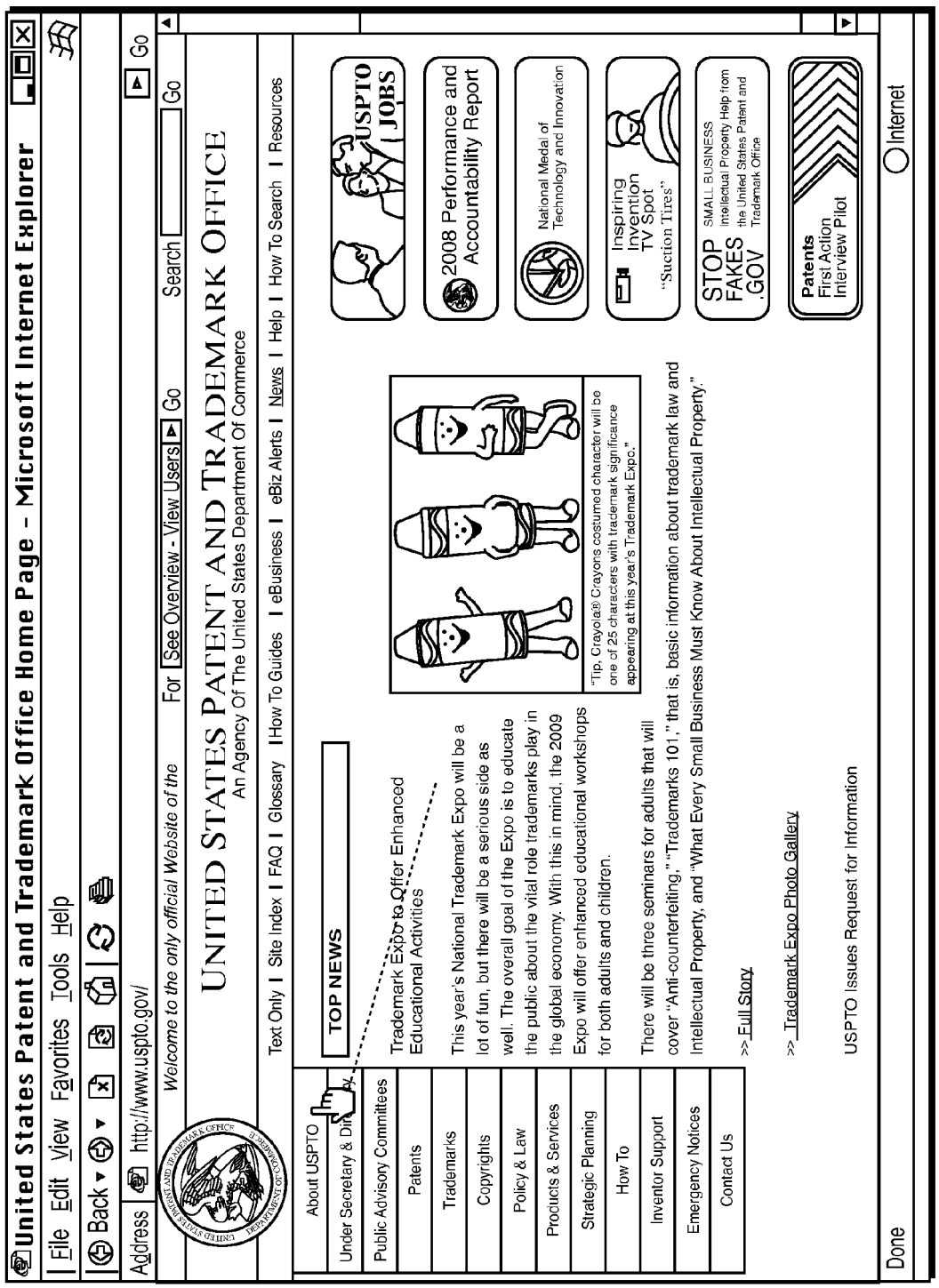
FIG. 6 illustrates a web browsing example using voice and head movement commands.

FIG. 6 is a another example of using a head movement and voice command to navigate web pages using a web browser. Here the user can select a move mode and use a head movement to position the cursor at a particular hyperlink of interest. Using the voice command "SELECT", the selected hyperlink e.g., "About USPTO" is then activated. The browser then moves forward to the selected web page. Thus, using hand or head movements, the user can select from among multiple hyperlinks displayed on a web page, and using a vocal command, then cause that hyperlink to be selected. Other combinations of hand/head movements and vocal commands may cause web pages to be scrolled up and down, page back or forward, or implement other typical web browser commands.

Figure 7:
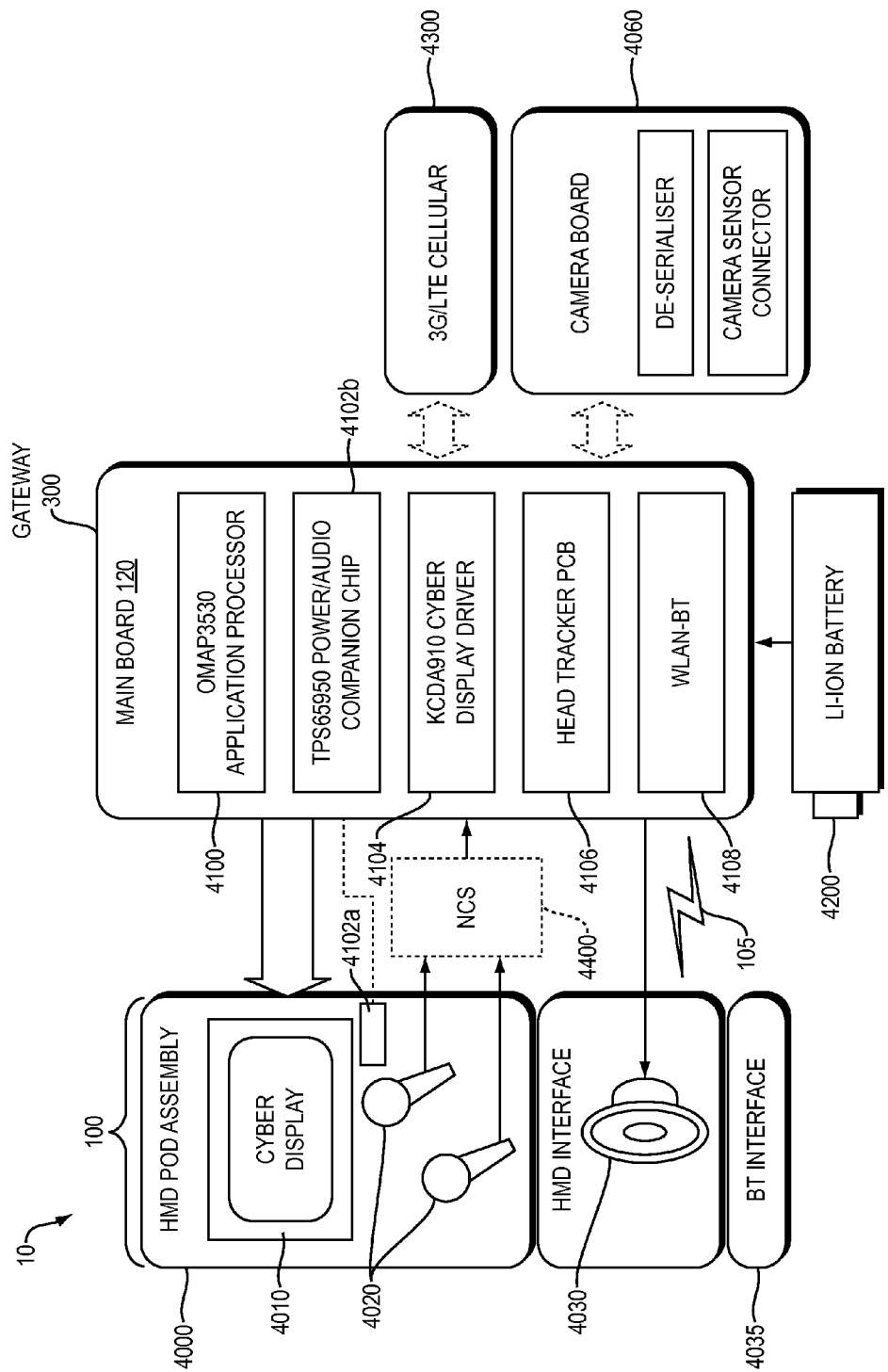
FIG. 7 is a high level block diagram of the electronic components of the HMD system.

FIG. 7 is a simplified high level block diagram of a non-limiting example of the components of HMD system 10. The HMD system 10 includes a headset or pod assembly 4000 that includes the aforementioned microdisplay 4010, and one or more microphones 4020. An earpiece may incorporate one or more speakers 4030. A lower power wireless interface 4035 may be a Bluetooth or WiFi interface. These components are integrated into the HMD housing 100 as was shown in FIG. 1A. As mentioned previously, the display 4010 may be in a removable subassembly or arm 1080.

The other system electronics are packaged in the gateway 300 and include an Open Media Application Platform (OMAP) application processor 4110, a power/audio companion chip 4102, a display driver 4104, a 3 axis to 9 axis position and movement head tracker 4105, GPS transceiver, digital compass (magnetometer) a circuit board 4106 and wireless LAN/Bluetooth interface 4108. Also located in the gateway 300 is a power source, such as a lithium ion battery 4200.

The head tracker circuitry 4106 detects head movements such as lateral movements along and rotation gestures around the X, Y and Z axes using Hall effect sensors, MIM diodes, accelerometers, gyros, a transducers and/or other sensors mentioned previously.

HMD system 100 may also receive inputs from external input devices such as a wireless mouse, track ball, or keyboard that may be wirelessly connected through the Bluetooth and/or WiFi interface 4108.

An NCS module 4400, which may reside in either the HMD headset 100 or HMD gateway 300, processes received microphone signals to provide voice command recognition functions, and produce audio signals to power/audio companion chip 4102.

The OMAP processor 4110 may include a central processing unit, and memory such as Random Access Memory (RAM) that may include SDRAM and/or Read Only Memory (ROM). The OMAP 4110 may be a Texas Instruments model OMAP 3530 processor sold by Texas Instruments, Inc. and used a multimedia processor. In this example, a TPS 65950 power/audio companion chip also available from Texas Instruments, is used to provide audio, USB, keypad control and battery charging functions to the system.

The WLAN/BT interface 4108 may be a model LBEE 1W8 NEC-interface circuit, Bluetooth module available from CSR Ltd. of Cambridge, United Kingdom, or other similar wireless interface. Interface 410810 operated at very low power, needing to only emit sufficient power to close a link between headset 100 and gateway 300. Power levels may even be user selectable.

The display driver may be a model KCD-A 910 display driver available from Kopin Corporation of Westborough, Mass.

The microdisplay, also available from Kopin, can include models 113LV, 152LV, 230LV, WQVGA, or other manufactures acceptable micro-displays.

The HMD gateway 300 is therefore used to contain certain other electronic components. Referring to FIG. 45, for example, the items in the center of the page are packaged in the belt-worn HMD gateway 300, including the OMAP processor 4100, power/audio companion chip 4102, display driver 4104, and optional, NCS module 4400.

As a result, the microdisplay, and head position, movement and body gesture tracking sensors and short range, low power Bluetooth and/or WiFi interface only are packaged in the HMD headset portion 100. High power processor 4100, and circuits 4102, WLAN communication functionality 4108 (e.g., WiFi, WiMax, Zig bee, 3G and 4G cellular, etc.) and certain other portions of the head position, movement and gesture tracker portions, enhanced by advanced signal processing and voice recognition functions are packaged only in the HMD gateway 300. Furthermore, functionality of the display driver 4104 may be split between minimal implementation (4102A) in the headset 100 with the remainder (4102B) gateway 300. Functions such as the long range wireless GSM, CDMA, 3G, 4G LTE or other like long rang wireless circuitry requiring relatively high power also re preferably only located in the gateway 300.

Additional functionality in the gateway 300 may include additional solid state memory, compact hard drive, memory cards, USB and many USB connectors, broadcast TV, radio and/or closed circuit audio/video connectivity, external displays and the like as discussed in connection with FIGS. 1B, 1C and 1D above.

As a result of the separate packaging of components as discussed above, rather than a need to contain all functions designed for the HMD system 100 in a single headset form factor, functionality can be placed away from the head onto the user's beltline. By moving as many functions as possible away from the head, leaving only what is absolutely necessary in the headset 100 component itself, a number of advantages are provided.

The headset 100 also generates only low power, short range Bluetooth and/or WiFi signals requiring less battery power, and emitting potentially less harmful radio frequency radiation, with the circuitry that generates the higher power, potentially more harmful wireless signals to the user's belt.

The headset 100 becomes lighter weight. The heavier components, such as the larger batteries, added memory capacity, touch screens, touch pads, pico projector, cell phone modems and the like needed for extended, demanding applications and long range communication are also moved to the user's beltline to gateway 300, and off of the head.

In other embodiments, the boom containing the display is detachable from the headset. This arrangement provides a three part subsystem consisting of the belt mounted gateway, the detachable boom and the headset. The headset then can include only speaker and microphone in this minimal configuration.

Thus, the user is given greater freedom in which devices are attached to his body and only as he needs. As the user goes about their day they may, for example, wear the Bluetooth and/or WiFi headset component 100 most of the time, waiting for or making telephone or VoIP calls from their iPhone or other smartphone host device 200. It is only when they wish to engage in high resolution computer use, web browsing, and so forth, would they then attach the display boom 1008 and gateway 300 to their belt, providing full functionality.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A head mounted display apparatus comprising:
a first component having a head mounted housing carrying at least a microphone and speaker;
a second component formed of a wearable housing on a body part other than the head, the second component containing additional electronic circuitry; and a relatively low transmission power, wireless interface between the first and second components, the low transmission power minimizing radio frequency radiation exposure to a user's head,
the first and second component having a stand-along mobile PC mode and a remote control mode;
wherein the second component includes a micro-computer and a higher transmission power interface to a host computing device, such that the second component serves as a gateway computing system for the first component in the remote control mode, and the first and second components operate together to provide a personal computer to the user with minimized exposure of radio frequency radiation to the user's head;
wherein the power level of the low transmission power wireless interface is user selectable.

2. The apparatus of claim 1 wherein the first component further comprises a boom supporting a micro-display as a video display.

3. The apparatus of claim 1 wherein the second component incorporates one or more of a voice recognition, gesture recognition, display driver, or high power wireless interface.

4. The apparatus of claim 1 wherein the low transmission power wireless interface between the first and second components is a low power, short range wireless interface.

5. The apparatus of claim 4 wherein the wireless interface is selected from Bluetooth or WiFi.

6. The apparatus of claim 1 wherein the second component further comprises a cellular, 3G, 4G, LTE or other long range communication network wireless interface.

7. The apparatus of claim 1 wherein the wearable housing of the second component comprises a belt clip.

8. The apparatus of claim 2 wherein the boom having the micro-display is detachable from the head mounted housing.

9. The apparatus of claim 1 wherein the host computing device is any of a laptop, cell phone, smart phone device or tablet computing device.

10. The apparatus of claim 1 wherein the host computing device has greater computational complexity and/or greater network connectivity than the first and second components operating together.

11. The apparatus of claim 1 wherein the host computing device is further connected to one or more computer networks including the Internet.

12. The apparatus of claim 1 wherein the higher transmission power interface is any of a Bluetooth link, a wireless Local Area Network (WLAN), a wireless wide area network (WAN), a cellular connection and other wireless connection.

13. A display method comprising:
providing a first component including a head mounted display component having (i) a head mounted housing carrying a microphone and a speaker, having
(ii) a configuration minimizing exposure, to a user's head, of radio frequency radiation;
providing a second component formed of:
a wearable housing on a body part of the user other than the head;
a micro-computer contained by the wearable housing, and
a high transmission power interface to a host computing device,
the second component spacing from the head mounted display component the micro-computer and the high transmission power interface in a manner maintaining minimized exposure of radio frequency radiation to the user's head;
wherein the first and second component having a stand-along mobile PC mode and a remote control mode; and
configuring between the head mounted display component and the second component a relatively low transmission power wireless interface, the low transmission power minimizing radio frequency radiation exposure to the user's head, and
wherein the second component serves as a gateway computing system for the head mounted display component in the remote control mode, and wherein the head mounted display component and the second component operate together to provide a personal computer to the user with minimized exposure of radio frequency radiation to the user's head;
wherein the power level of the low transmission power wireless interface is user selectable.

14. A method as claimed in claim 13 wherein the host computing device is any of a laptop, cell phone, smart phone device or tablet computing device.

15. A method as claimed in claim 13 wherein the host computer device has greater computational complexity and/or greater network connectivity than the head mounted display component and second component operating together.

16. A method as claimed in claim 13 wherein the host computing device is further connected to one or more computer networks including the Internet.

17. A method as claimed in claim 13 wherein the head mounted display component further comprises a detachable boom supporting a micro-display.

18. A method as claimed in claim 13 wherein the second component further comprises a cellular, 3G, 4G, LTE or other long range communication network wireless interface.

19. A method as claimed in claim 13 wherein the wearable housing of the second component comprises a belt clip.

* * * * *